United States Patent [19]
Brown et al.

[11] Patent Number: 5,661,618
[45] Date of Patent: Aug. 26, 1997

[54] MAGNETIC RECORDING DEVICE HAVING A IMPROVED SLIDER

[75] Inventors: Charles Allan Brown, Los Gatos; Mark Stephen Crowder, Gilroy; Donald R. Gillis, San Jose; Andrew Marian Homola, Morgan Hill; Vedantham Raman; George William Tyndall, III, both of San Jose, all of Calif.

[73] Assignee: International Business Machines Corporation, Armonk, N.Y.

[21] Appl. No.: 570,050

[22] Filed: Dec. 11, 1995

[51] Int. Cl.⁶ .................................................. G11B 33/14
[52] U.S. Cl. ...................................... 360/97.02; 360/103
[58] Field of Search ............................. 360/97.02–97.03, 360/102–103

[56] References Cited

U.S. PATENT DOCUMENTS

| | | | |
|---|---|---|---|
| 4,601,950 | 7/1986 | Iida et al. | 428/421 |
| 4,626,941 | 12/1986 | Sawada et al. | 360/103 X |
| 4,761,699 | 8/1988 | Ainslie et al. | 360/103 |
| 4,794,035 | 12/1988 | Ishihara et al. | 428/219 |
| 4,863,809 | 9/1989 | Brar et al. | 428/623 |
| 4,876,117 | 10/1989 | Bornstein | 427/130 |
| 4,894,740 | 1/1990 | Chhabra et al. | 360/103 |
| 4,960,609 | 10/1990 | Homola et al. | 427/38 |
| 4,974,104 | 11/1990 | Ferguson et al. | 360/4 X |
| 5,041,932 | 8/1991 | Hamilton | 360/104 |
| 5,080,948 | 1/1992 | Morita et al. | 428/64 |
| 5,118,577 | 6/1992 | Brar et al. | 428/409 |
| 5,200,867 | 4/1993 | Albrecht et al. | 360/103 |
| 5,200,869 | 4/1993 | Matsuzaki | 360/103 |
| 5,223,342 | 6/1993 | Shoji et al. | 428/413 |
| 5,231,613 | 7/1993 | Nakayama et al. | 369/13 |
| 5,260,845 | 11/1993 | Takayama et al. | 360/103 |
| 5,278,711 | 1/1994 | Gregory et al. | 360/103 |
| 5,438,467 | 8/1995 | Dorius et al. | 360/103 |

FOREIGN PATENT DOCUMENTS

| | | | |
|---|---|---|---|
| 3067510A2 | 10/1989 | European Pat. Off. | G11B 23/50 |
| 679363A2 | 11/1995 | European Pat. Off. | |
| WO94/08334 | 4/1994 | WIPO | G11B 5/60 |
| WO94/08335 | 4/1994 | WIPO | G11B 5/60 |

*Primary Examiner*—John H. Wolff
*Attorney, Agent, or Firm*—Robert B. Martin

[57] ABSTRACT

The invention relates to an improved high performance magnetic recording device. The recording device comprises a magnetic recording disk, a slider having a transducer for reading or writing data on the disk, a motor operable to rotate the disk at speeds greater than 7000 RPM and an actuator connected to the slider to move the slider across the disk. The trailing surface of the slider is coated with a low surface energy film to prevent build up of droplets of liquid contaminants.

16 Claims, 2 Drawing Sheets

MAGNETIC RECORDING DEVICE HAVING A IMPROVED SLIDER

The present invention relates to an improved magnetic recording device having an improved slider and an improved process for magnetic recording.

BACKGROUND OF THE INVENTION

Current growth rates for the digital magnetic recording data storage industry show an increase in recording densities of 60% per year. To continue on this growth rate curve, the recording industry is being forced to make a number of significant changes in the design of the magnetic recording device. Digital magnetic recording devices for data storage generally comprise a thin film magnetic recording disk and a head or transducer which is moved along or above the surface of the rotating disk to read and write information on the disk. Advanced high areal density, thin film magnetic recording disks comprise a rigid substrate preferably having a dual zone textured surface, a magnetic layer such as a cobalt-based metal alloy, a protective amorphous carbon layer and a lubricant layer, such as a perfluoropolyether disposed on the carbon overcoat. The dual zone texture of the disk substrate is made up of a highly polished surface over the area of the disk used for reading and writing data, and a textured surface over the area of the disk used for landing the head when the recording device is not in use. The highly polished surface of the "data zone" functions to: a) minimize interactions between the surface of the disk and the head and b) reduce the number of errors encountered during reading and writing operations. No data is stored in the textured "landing zone" and its presence is desired to eliminate stiction upon file start-up. Stiction is the tendency of a landed stationary magnetic recording head to resist movement, e.g., translational movement along the surface of the disk. High stiction can lead to mechanical failure of the head or disk.

The transducer is attached to a carrier or slider having an air bearing surface which is supported during operation adjacent the data surface of the disk by a cushion of air generated by the rotating disk. Since recording density depends exponentially on the separation distance between the recording element of the head and the magnetic layer of the disk, lower fly heights are needed for high areal density recording, and a head utilizing a negative air bearing, such as described in U.S. Pat. No. 4,894,740, may be employed to achieve high areal density. However, lower fly heights can cause an increase in the interaction of the head with the disk during normal flying.

The recording device also comprises a positioning actuator connected to the carrier for moving the head to the desired location on the disk during reading or writing operations.

Gitis PCT application US9309460, published Apr. 14, 1994, teaches that during operation, the head and disk are exposed to particulate contaminates such as dust and carbon particles fractured from the protective carbon layer of the disk by head/disk contact. These particles tend to build up on the slider and may eventually lead to head crash during operation of the recording device. Gitis claims vapor depositing low surface energy polymers on the wear pad of the slider of contact recording devices and a vertical side, to minimize particle build up on the slider.

Conventional non contact magnetic recording devices are operated at a rotational speed of about 3600 RPM to about 5400 RPM and at fly height of 80 to 100 nm. It has been discovered that stiction problems are encountered when high areal density recording devices are operated continuously at higher speeds, e.g., 7200 and lower fly heights. However, it is desired to reduce the data access time for high areal density recording by increasing the rotational speed of the disk without encountering the stiction problem. There still is a need in the art for a high areal density magnetic recording device which can operate at higher rotational speeds without stiction.

It is an object of the present invention to provide an improved high areal density, non contact magnetic recording device which operates at a higher rotational speed without a stiction problem.

Other objects and advantages will be apparent from the following disclosure.

SUMMARY OF THE INVENTION

The present invention relates to a high areal density, digital magnetic recording data storage device for non contact recording which can operate at a rotational speed greater than 7000 RPM and fly heights less than 75 nm without a stiction problem. The high areal density magnetic recording device of the present invention comprises (a) a disk comprising a substrate, a metallic magnetic layer, a carbon layer and a lubricant layer preferably having a thickness of about 5 Å to about 25 Å (b) a motor associated with the disk operable for rotating the disk at rotational speeds greater than 7000 RPM; (c) a head supported on an air bearing carrier for magnetically reading data to or magnetically writing data from the magnetic layer on the disk; the trailing surface the carrier cover with a thin layer having a surface energy less than 25 ergs/cm$^2$, the layer being immiscible in condensible contaminates, e.g., hydrocarbon lubricants; and (d) an actuator connected to the head carrier for moving the head across the disk. Preferably the thin layer on the carrier comprises a fluoropolymer which is preferably stabilized on the surface by physi or chemisorption, ultraviolet radiation, heat or is beam deposited onto the trailing surface of the carrier, e.g., by ion beam or plasma polymerization or sputtering.

The fluoropolymer coating on the trailing surface of the carrier eliminates the stiction problem associated with high performance, high density magnetic recording devices.

A more thorough disclosure of the present invention is presented in the detailed description which follows and the accompanying figures.

DETAILED DESCRIPTION OF THE INVENTION

The present invention relates to an improved high performance digital magnetic recording device for reading and writing data magnetically.

Figure 1:
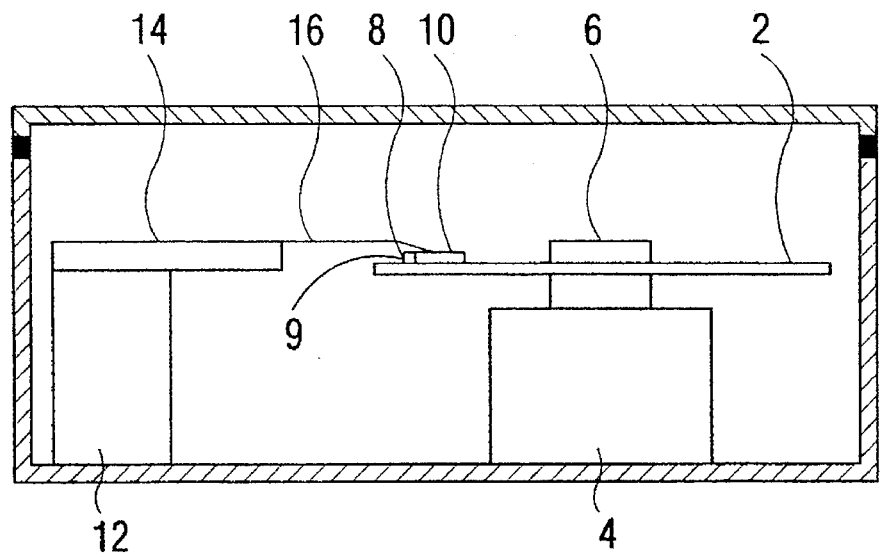
FIG. 1 is a section view of the magnetic recording disk drive.
Figure 2:
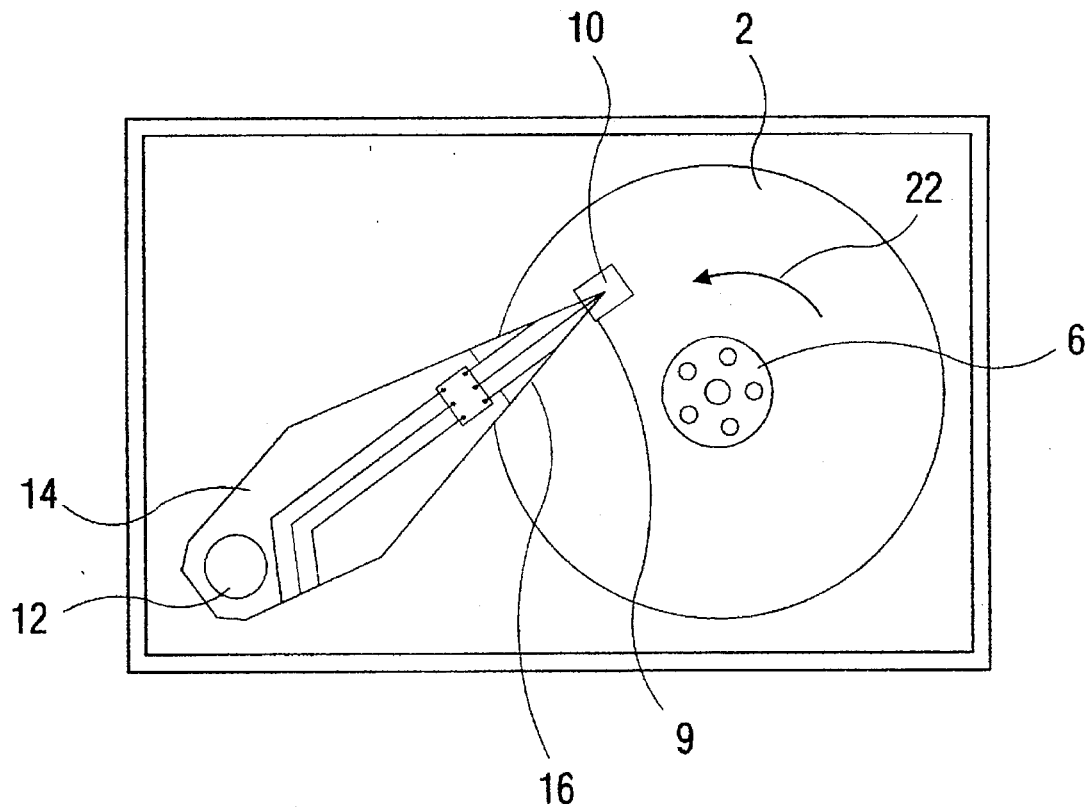
FIG. 2 is a top view of the magnetic recording disk drive.

Referring to FIGS. 1 and 2, there is shown a magnetic recording disk drive of the present invention. The magnetic recording disk 2 is rotated by drive motor 4 with hub 6, which is attached to the drive motor. The disk comprises a substrate, a metalic magnetic layer, a carbon layer and a polymeric lubricant layer, e.g., perfluoropolyether. It is desired that the thickness of the lubricant layer on the disk be about 5 Å to 25 Å.

Figure 3:
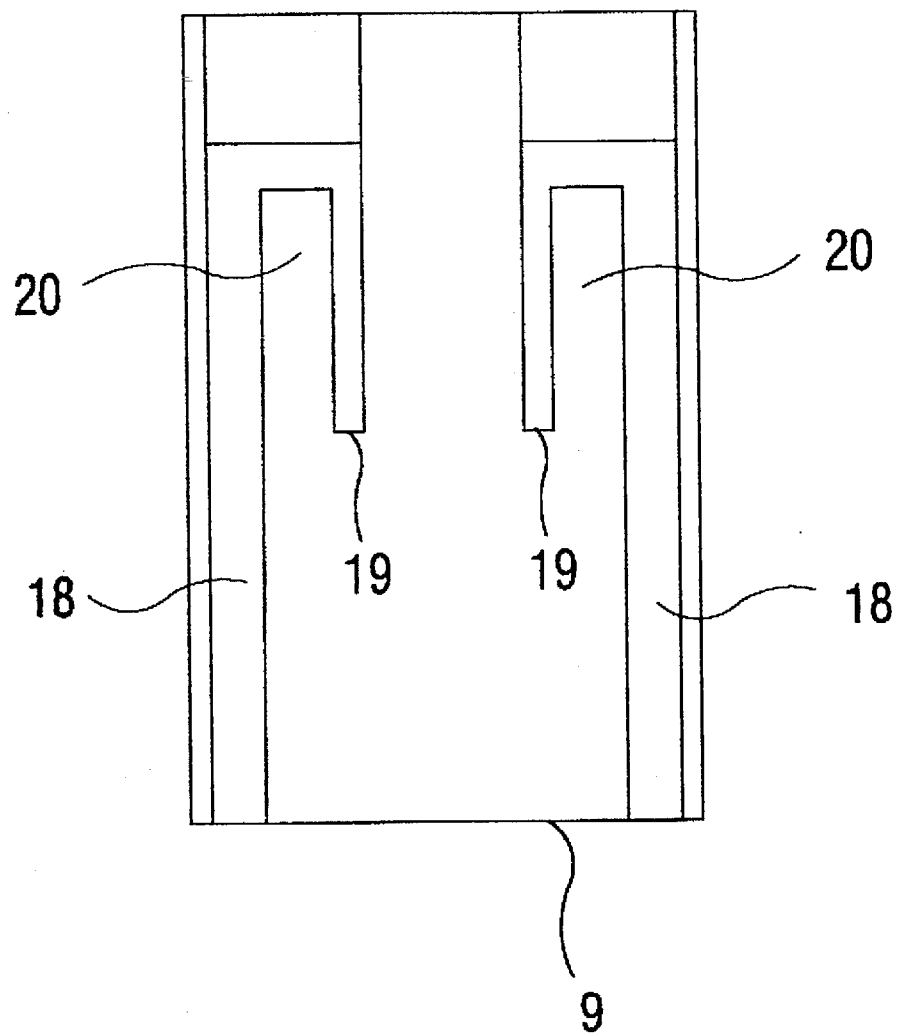
FIG. 3 is a bottom view of the carrier for the magnetic recording head.

A read/write head or transducer 8 is formed on the trailing end of a carrier, or slider 10. Suitable sliders are positive or negative air bearing sliders. Suitable negative air bearing sliders are disclosed in U.S. Pat. Nos. 4,894,740 and 5,438,467, the disclosures of which are incorporated herein by reference. The slider 10 has trailing surface 9. Head 8 may be an inductive read and write transducer or an inductive write transducer with a magnetoresistive read transducer. The slider 10, is connected to the actuator 12 by means of a rigid arm 14 and a suspension 16. The suspension 16 provides a bias force which urges the slider 10 onto the surface of the recording disk 2. Referring to FIG. 3, there is shown a bottom view of a suitable negative air bearing slider with outer rails 18 and inner rails 19 and and etch pockets 20 which are depressions formed between the inner and outer rails.

During operation of the disk drive, the drive motor 4 rotates the disk 2 at a constant speed in the direction of arrow 22, and the actuator 12, which is typically a linear or rotary motion coil motor, moves the slider 10 generally radially across the surface of the disk 2 at a height of less than 75 nm so that the read/write head may access different data tracks on disk 2.

The sources of the stiction problem for high performance magnetic recording devices have been discovered. First, the high rotational speed of the recording device, (e.g., 7000 RPM or more) causes increased frictional heating resulting in substantial increase in the vapor pressure of the hydrocarbon lubricants used in the spindle bearing, disk motor and actuator bearing and coil. Further, the high rotational speed causes an increase in the temperature gradient between the rotating parts and the slider. Secondly, the lower fly height enhances the contact between the slider and the disk increasing the chance of transfer of contaminants. These factors in combination with the increase in air compression and air flow experienced by the carrier due to the increased flying velocity cause condensation of liquid contaminates such as hydrocarbons, water, lubricant and the like on the trailing surface and in the etch pockets of the slider after continuous operation. When the slider stops on the disk surface, these droplets bridge onto the disk to create significant stiction for the slider.

The low surface energy film on the trailing surface of the slider and the etch pockets of the slider minimizes the build up of condensible contamination on the slider during operation of high performance magnetic recording devices thereby eliminating the stiction problem. Preferably, the entire portion of the trailing surface of the head and also the etch pockets are coated with low surface energy film to minimize any condensation of contaminates on the slider during operation.

The low surface energy film preferably comprises fluoro organic material, preferably a fluoropolymer. Fluoropolymer as used herein means an organic polymer which contains fluorine. The film coating the slider preferably has a number of unique properties. The film has a surface energy less than 25 ergs/cm$^2$, preferably less than 20 ergs/cm$^2$, and preferably less than 15 egs/cm$^2$ to minimize condensation of condensible contaminates. The fluoropolymer film has a glass transition temperature (Tg) of greater than 25° C., preferably greater than 50° C. The film is insoluble in hydrocarbon lubricants and immiscible in the lubricant disposed on the disk. The thickness of the film layer on the slider will be less than 100 Å, preferably less than 50 Å and most preferably less than 20Å and the film will be continuous without voids on the trailing edge and etch pockets of the slider. Preferred classes of fluoropolymers for use in the present invention include fluorinated acrylates/methacrylates, polyfluoroinated alkanes and polymers containing significant $CF_3$ and $CF_2$ group at the surface. Preferred specific fluoropolymers are polytetrafluoroethylene and polyhexafluoropropylene. Other suitable fluoropolymers will be known to those skilled in the art.

The fluoropolymer can be applied to the trolling surface of slider by a variety of art known processes. For example, a fluoropolymer can be applied to the slider using a dipping process, a vapor transport process, or a spray process. In the dipping process, a fluoropolymer of low surface energy, e.g., poly(fluoroalkylmethacrylate) such as Fluorad FC 722 brand made by 3M Company is dissolved in a fluorocarbon based solvent, e.g., perfluorohexane, at a concentration of 400–700 ppm. Actuators made up of suspended sliders are mounted onto a support and dipped into the solution containing the fluoropolymer. The dip angle, and pull rate are adjusted to obtained the desired thickness.

In another embodiment, a fluoro organic material such as a fluorinated long chain polar molecule, e.g., fluorinated fatty acid, are spontaneously adsorbed onto the surface of the slider by dipping. The molecules form a densely packed monalayer on the surface. The molecules self-assemble where the polar groups bond to the surface and the rest of the molecule having the fluorinated groups, e.g., $CF_2$ and $CF_3$ are positioned away from the surface.

In another embodiment, a fluoropolymer can be applied to the trailing surface of the head by beam deposition. The fluoropolymer treatment of the head is performed in-vacuo using known thin-film processing techniques such as ion beam deposition, plasma polymerization, or sputtering. The in-vacuo deposition of a fluoropolymer onto the magnetic recording head can be accomplished using a plasma polymerization technique. In this process, either sliders attached to suspensions, free sliders, slider rows prior to formation of individual sliders or wafers before slider rows are formed can be coated. A fluorinated precursor of the desired fluoropolymer is introduced to a vacuum chamber which is pumped to a pressure of nominally 1 mtorr. For example, hexafluoropropane, hexafluoropropylene and Argon are flowed into the plasma chamber at flows of 250 SCCM, 35 SCCM and 900 SCCM, respectively. The chamber pressure is set at 200 mtorr and 750 W of RF power at 17 kHz is used to initiate plasma formation. Deposition is carried out for 30–60 seconds. Under these conditions, 25 Angstrom of fluoropolymer is formed on the air bearing surface of the slider and 40 Angstrom is formed on the trailing end/etch pocket of the head. Other film forming fluoro organics for use as precursors in this process will be known to those skilled in the art.

Another embodiment of this process also involves the formation of a monolayer of fluoroorganic material on the slider surface. In this process, a fluorocarbon gas such as perfluorocarbon $C_1$–$C_{10}$ gas, e.g., trifluoromethane, hexafluoroethane, octafluoropropane, etc can be introduced to the plasma chamber and an RF plasma generated. In this embodiment, the fluorocarbon precursors serve as the feed stock to produce fluorinated organic fragments of the general form CxFy that are attached to the surfaces of the magnetic recording head. CF3 groups having a surface energy of nominally 15 ergs/cm2 would be the favored attachment species, however, CF2 groups (20 ergs/cm2) would also be desirable.

A fluoropolymer may also be formed on the surface of the slider using RF sputtering from a target made from a low free energy surface material, for example (poly) tetrafluoroethylene (teflon) with a surface energy of 20 ergs/cm2 would be suitable. Typically an inert gas such as argon is used to create the necessary plasma for the sputtering process. It is introduced to the vacuum chamber at pressures on the order of 10 mtorr. RF power is supplied to the chamber causing ionization of the inert sputtering gas. These inert gas, ions are then accelerated to the low surface energy target causing sputtering of the target. The sputtered target fragments are then collected on the desired surfaces of the magnetic recording head. This process can be conducted on suspended heads, free heads, or can be done at the row level or wafer level.

A variation of this embodiment would entail the use of a fluoroinated gas to create the plasma necessary for sputtering. In this process, the proper choice of fluororganic, e.g., tetrafluoromethane, hexafluoroethane, etc., are expected to incorporate more CF3 into the deposited polymer film thereby lowering the overall surface energy from nominally 20 ergs/cm2 to 15 ergs/cm2.

The present invention or writing with a process for magnetically reading or writing with a magnetic recording device. The process comprises the steps of:

(a) rotating a magnetic recording disk at a rotational speed greater than 7000 RPM;

(b) aero dynamically floating a magnetic recording head adjacent to the rotating disk at a fly height less than 75 nm to magnetically read data to or write data from the disk, the trailing surface of the head having a low surface energy film having a surface energy less than 25 ergs/cm$^2$ and being immiscible in condensible contaminates.

Preferably, the fly height is less than 70 nm preferably from about 55 nm to about 70 nm; more preferably from about 55 nm to about 65 nm and more preferably about 60 nm.

The following examples are detailed descriptions of the present invention. The detailed descriptions fall within the scope of and serve to exemplify, the more generally described invention set forth above. The examples are presented for illustrative purposes only, and are not intended as a restriction on the scope of the invention.

EXAMPLES

Sliders

The trailing surface of the slider of the present invention was coated with a low surface energy fluoropolymer by the following procedure.

A solution was prepared containing poly (fluoroalkylmethacrylate) (500 ppm by weight) in a solvent. The slider is fully dipped in solution withdrawn at a pull rate of 1 mm/sec. The slider is withdrawn from the liquid into the solvent vapor.

Test Device

The tester comprises 2 standard spindles for disks with 7200 RPM spinning capability. Two sliders are mounted per disk (top and bottom) with fixed location at the OD of the disks (about 40 mm radius). Compressed air to the suspension mount allows loading/unloading the slider on/off the disk.

The spindles are covered with a plexiglass hood, which contains openings to allow for air exhaust. By means of a plastic tubing of diameter 10 mm and length about 1 m a steady flow of hydrocarbon rich air is injected into the plexiglass hood from an external source.

This HC-source is an aluminum box placed on a heater plate. The temperature can be adjusted. Hydrocarbon materials such as bearing grease are applied to the inner bottom plate (the source plate) of the aluminum box. The box is then closed and heated to typically 70° C. and an adjustable flow of air, typically 1 l/min, is fed through the aluminum box into the plexiglass hood and around the spindles as described above.

Operation of the Test

Clean disks are mounted to the spindles and the sliders loaded on the disks. The plexiglass hood is covered over the spindles. The HC-source is loaded with the appropriate grease, heater and air flow turned on in order to provide a hydrocarbon-rich atmosphere within the plexiglass hood. Head/disk pairs are run at 7200 RPM for 12 hours.

Results

Sliders with fluoropolymer on tailing surface 2–7 gm stiction

Sliders without fluoropolymer on trailing surface 20–40 gm stiction

Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A magnetic recording device for reading or writing non contact magnetically comprising:

(a) a disk comprising a substrate, a metallic magnetic layer, a carbon layer and a lubricant layer;

(b) a head supported on an air bearing slider for magnetically reading data to or magnetically writing data from the magnetic layer on the disk, the trailing surface of the slider covered with an organic film which is immisicible in hydrocarbon lubricants and has a surface energy less than 25 ergs/cm$^2$;

(c) a motor operable to rotate the disk at a rotational speed greater than 7000 RPM and fly height less than 75 nm; and (d) an actuator connected to the slider for moving the head across the disk.

2. The device of claim 1 wherein the film comprises a fluoropolymer.

3. The device of claim 2 wherein the fluoropolymer is poly(fluoroacrylate), poly(fluoromethacrylate) or poly(fluoroalkane).

4. The device of claim 3 wherein the fluoropolymer is poly(fluoroalkylmethacrylate) or poly(tetrafluoroethylene).

5. The device of claim 2 wherein the fluoropolymer is dip applied on the slider.

6. The device of claim 2 wherein the fluoropolymer is beam deposited on the slider.

7. The device of claim 2 wherein the slider is a negative air bearing slider.

8. The device of claim 1 wherein the fly height is greater than 55 nm.

9. A process for magnetically reading or writing with a non contact magnetic recording device comprising the steps of:

(a) rotating a magnetic recording disk at a rotational speed greater than 7000 RPM;

(b) aero dynamically floating a magnetic recording head on a slider less than to 75 nm from the rotating disk to magnetically read data to or write data from the disk, the trailing surface of the slider having an organic film which is immiscible in hydrocarbon lubricants and has a surface energy less than 25 ergs/cm$^2$.

10. The process of claim 9 wherein the film comprises a fluoropolymer.

11. The process of claim 10 wherein the fluoropolymer is, poly(fluoroacrylate), poly(fluoromethacrylate) or poly (fluoroalkane).

12. The process of claim 11 wherein the fluoropolymer is poly(fluoroalkylmethacrylate) or poly(tetrafluoroethylene).

13. The process of claim 10 wherein the fluoropolymer is dip applied on the slider.

14. The process of claim 10 wherein the fluoropolymer is beam deposited on the slider.

15. The process of claim 10 wherein the slider is a negative air beating slider.

16. The process of claim 9 wherein the head is floated greater than 55 nm from the disk.

* * * * *